United States Patent [19]

Kalmus

[11] 3,938,147

[45] Feb. 10, 1976

[54] FREQUENCY MODULATED DOPPLER DISTANCE MEASURING SYSTEM

[75] Inventor: Henry P. Kalmus, Washington, D.C.

[73] Assignee: The United States of America as represented by the Secretary of the Army, Washington, D.C.

[22] Filed: May 19, 1959

[21] Appl. No.: 814,351

[52] U.S. Cl.................................. 343/7 PF; 343/14
[51] Int. Cl.².......................... G01S 9/24; F42C 13/04
[58] Field of Search............ 343/14, 17.1 R, 7 PF, 7

[56] References Cited
UNITED STATES PATENTS

| | | | |
|---|---|---|---|
| 2,612,636 | 9/1952 | Rust et al............................. | 343/14 |
| 2,842,764 | 7/1958 | Harvey................................. | 343/14 |
| 3,076,191 | 1/1963 | Williams.............................. | 343/14 |
| 3,189,899 | 6/1965 | Slater................................... | 343/14 |
| 3,829,859 | 8/1974 | Kalmus et al........................ | 343/14 |

Primary Examiner—T. H. Tubbesing
Attorney, Agent, or Firm—Nathan Edelberg; Robert P. Gibson; Saul Elbaum

EXEMPLARY CLAIM

4. A single antenna missile fuzing system adapted to function at a predetermined distance from a target, said system comprising in combination: a microwave oscillator, a frequency modulator for modulating said oscillator at a frequency which is considerably lower than the doppler frequency occurring when the missile is falling at terminal velocity, a magic tee having first and second side arms, an H-arm and an E-arm, the output of said microwave oscillator being fed to said H-arm, an antenna connected to said first side arm and adapted to radiate energy towards a target and receive energy reflected therefrom, a load connected to said second side arm, a crystal detector disposed in said E-arm, said load being chosen so that only a relatively small portion of the energy from said microwave oscillator passes to said crystal detector to mix with the received energy passing to said detector from said first side arm, the output of said detector comprising a frequency modulated wave having a carrier frequency equal to the doppler frequency and sidebands equal, respectively, to the sum and differences of said carrier frequency and said modulation frequency and its harmonics, said frequency modulated wave having a frequency deviation which is dependent upon target distance, an amplifier to which said detected signal is fed, said amplifier being tuned to the doppler frequency and having a bandwidth which is equal to at least twice said modulation frequency, a limiter to which the output of said amplifier is fed for producing an essentially constant amplitude signal, a frequency discriminator to which the output of said limiter is fed, said discriminator producing an output voltage which is substantially proportional to target distance, and means connected to the output of said discriminator for functioning said fuze when the output of said discriminator is a predetermined value corresponding to said predetermined distance.

4 Claims, 6 Drawing Figures

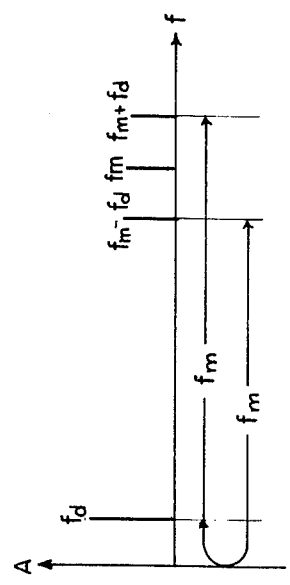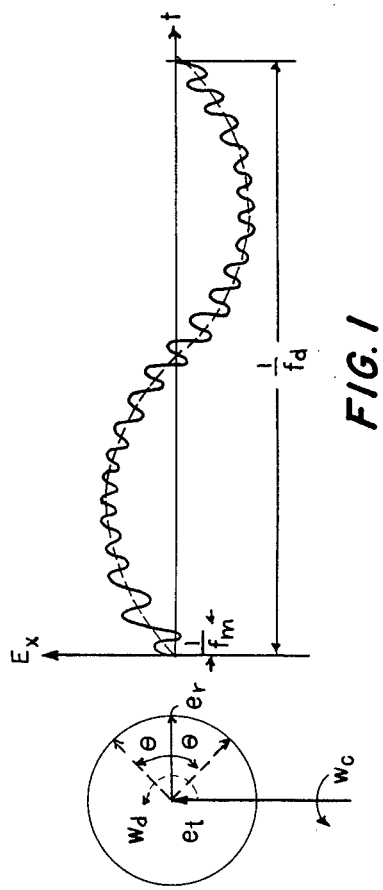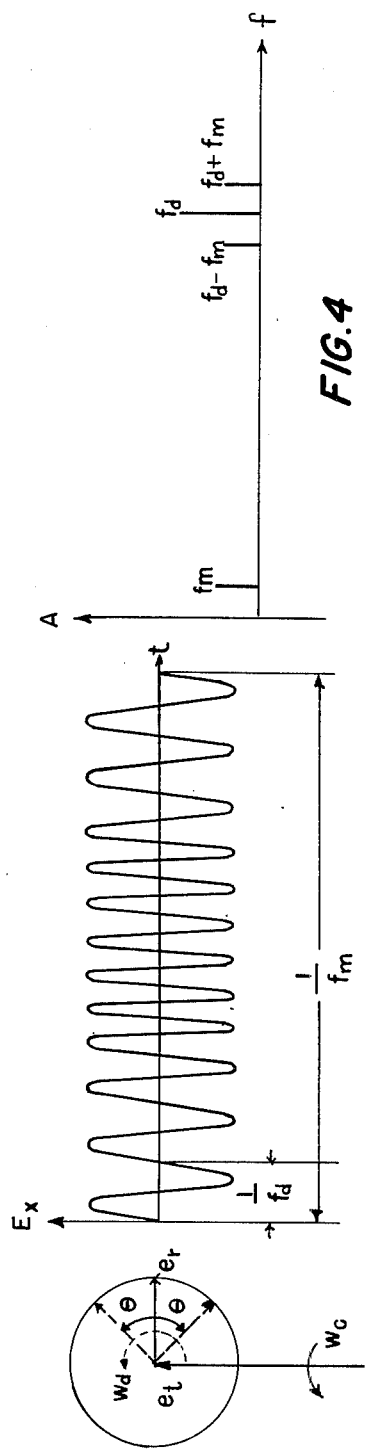
INVENTOR
HENRY P. KALMUS

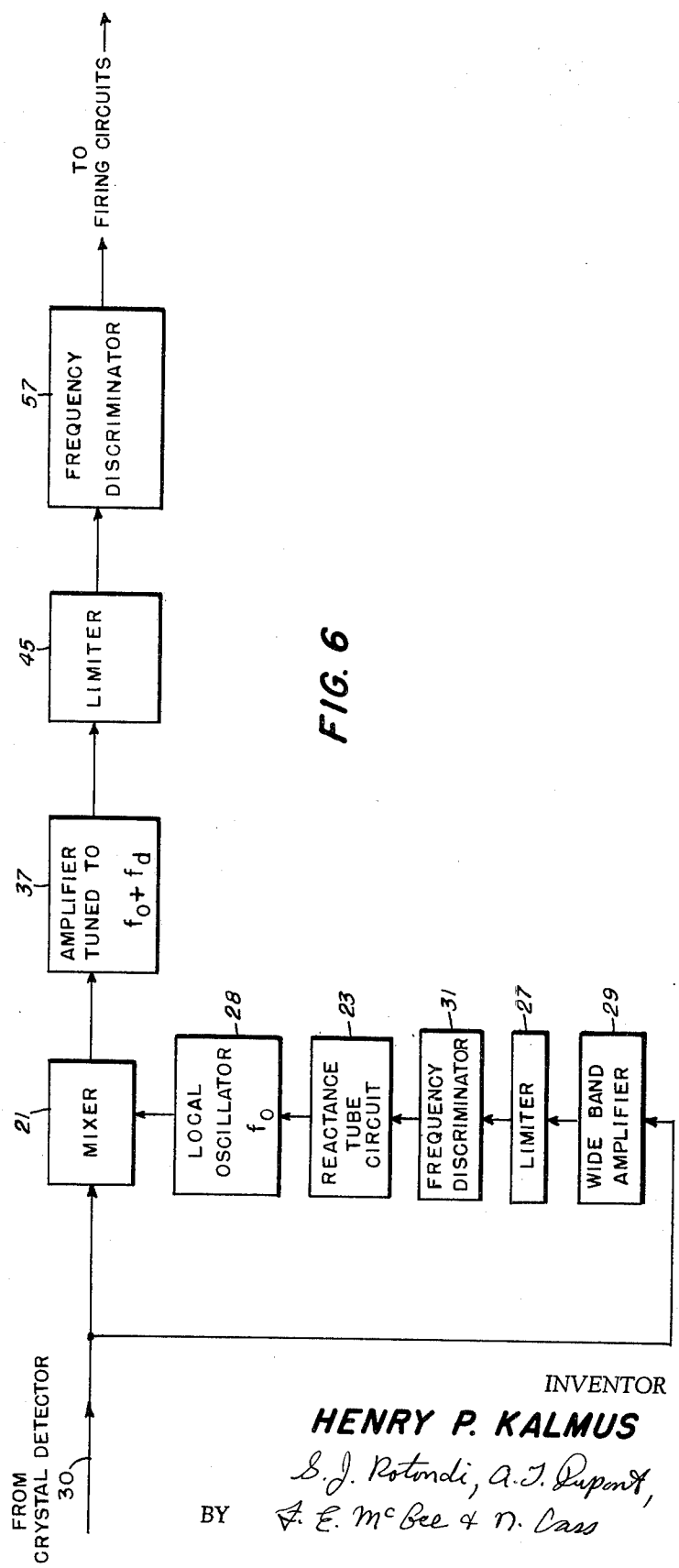

FREQUENCY MODULATED DOPPLER DISTANCE MEASURING SYSTEM

The invention described herein may be manufactured and used by or for the Government for governmental purposes without the payment to me of any royalty thereon.

This invention relates generally to distance measuring systems and more particularly to a frequency modulated doppler distance measuring system for use in an ordnance missile fuzing system.

Frequency modulated distance measuring systems presently known to the art obtain distance information by mixing the transmitted and received signals and observing the characteristics of the fundamental and/or harmonics of the modulating frequency components of the detected signal produced at the mixer output. The devices described in applicant's co-pending applications, Ser. No. 460,789 filed Oct. 6, 1954, now U.S. Pat. No. 3,829,859, and Ser. No. 489,005 filed Feb. 17, 1955, now U.S. Pat. No. 3,821,737, are examples of systems of this type. Because such systems are designed to be responsive to the modulating frequency or harmonics thereof, they are particularly sensitive to unwanted reflections occurring therein, and also to signals reflected from targets whose distance should not be measured. In addition, amplitude modulation at the modulating frequency, which is inherently produced by frequency modulation of the transmitting oscillator, is passed on to the conventional form of receiver used in such systems so as to be indistinguishable from the desired information, thereby requiring that means be provided to render it harmless.

In these prior art frequency modulated systems, therefore, it is necessary that two separate antennas or a critically balanced magic tee arrangement be used which provide high decoupling between the transmitting and receiving systems. Also necessary is a servo-loop to keep amplitude modulation introduced into the receiver as small as possible, and a balanced detector is further necessary to eliminate from the detector output the small amount of amplitude modulation which could not be prevented from being passed on to the receiver.

Where distance measuring systems of the above-described type are to be used for missile fuzing, the problems of unwanted reflections and amplitude modulation effects are especially severe because of the restrictive missile environment which prevents attaining a high degree of decoupling between transmitting and receiving systems, and where additional required compensatory circuitry is undesirable, if not prohibitive.

Accordingly, it is an object of this invention to provide a frequency modulated distance measuring system which is insensitive to internal reflections and amplitude modulation effects.

Another object is to incorporate the system of the abovementioned object in a missile fuzing system.

A further object is to provide a frequency modulated distance measuring system having only a single antenna without the need for a critically balanced magic tee arrangement.

In a typical embodiment of the invention, the above objects are achieved by a missile fuzing system in which a modulation frequency is utilized which is considerably lower than the doppler frequency from the relative velocity between the missile and the target. In prior art systems, just the opposite condition is chosen with the modulation frequency considerably higher than the doppler frequency. The output obtained after the transmitted and received waves are mixed in a system where the modulation frequency is considerably lower than the doppler frequency has been found to have the form of a conventional frequency modulated wave whose carrier frequency is equal to the doppler frequency and whose frequency deviation F' is proportional to distance. It should be noted, that this frequency deviation F' represents the frequency deviation of that signal resulting from the mixing of the transmitted and received waves, and is different from the frequency deviation F of the transmitted wave. It is important to bear in mind that these two frequency deviations, F and F', represent the frequency deviation parameter of two completely different waves. The frequency deviation F of the transmitted wave is an arbitrary quantity which is completely determined by the design and adjustment of the transmitter. The frequency deviation F' of the mixed wave is dependent on the characteristics of the transmitted wave, the velocity of the system with respect to the target, and the distance D between target and ground, as will be explained in greater detail, infra. The distance intelligence is then extracted by passing the mixer output through conventional F-M circuitry comprising: an amplifier tuned to the doppler frequency with a bandwidth determined by the frequency deviation F' and the distance at which fuze functioning is desired, a limiter to obtain an essentially constant amplitude signal, a frequency discriminator to transform the distance information from its frequency form into amplitude form, and a firing circuit adapted to produce a firing signal when the output of the frequency discriminator reaches a desired amplitude corresponding to a predetermined distance.

The only undesirable feature of the above-described typical embodiment is that because it requires an amplifier tuned to the doppler frequency, this simple embodiment is applicable only to missiles which experience a substantially constant known velocity during the measuring time. This requirement offers no problem in the case of a falling missile which is known to reach a constant velocity (called terminal velocity) at a high enough altitude so as to make the assumption of constant velocity valid; and this constant velocity can be predicted or experimentally determined with considerable accuracy for any given type of missile.

Where the velocity is not constant or known, the system may be made operable over a wide range of velocities by incorporating means responsive to the doppler frequency which will effectively vary the center frequency of the receiver in accordance with the doppler frequency.

The specific nature of the invention, as well as other objects, uses, and advantages thereof, will clearly appear from the following description and from the accompanying drawing, in which:

FIG. 1 is a vector diagram and graph illustrating the vector relationship and the mixer signal obtained in prior art systems where the modulation frequency $f_m$ is considerably higher than the doppler frequency $f_d$.

FIG. 2 is a graph showing the fundamental frequency spectrum for prior art systems of the above-discussed type.

FIG. 3 is a vector diagram and graph illustrating the vector relationship and the mixer signal obtained in a system in accordance with the invention where the doppler frequency $f_d$ is considerably higher than the modulation frequency $f_m$.

FIG. 4 is a graph showing the fundamental frequency spectrum for the system in accordance with this invention.

FIG. 6 is a block diagram of a modification which may be incorporated in the embodiment of FIG. 5 to eliminate the requirement of a constant missile velocity.

FIGS. 1–4 show the essential difference between the frequency modulated distance measuring system of this invention and that of the prior art, FIGS. 1 and 2 referring to the mixer output signal of the latter and FIGS. 3 and 4 to the mixer output signal of the former.

Figure 5:
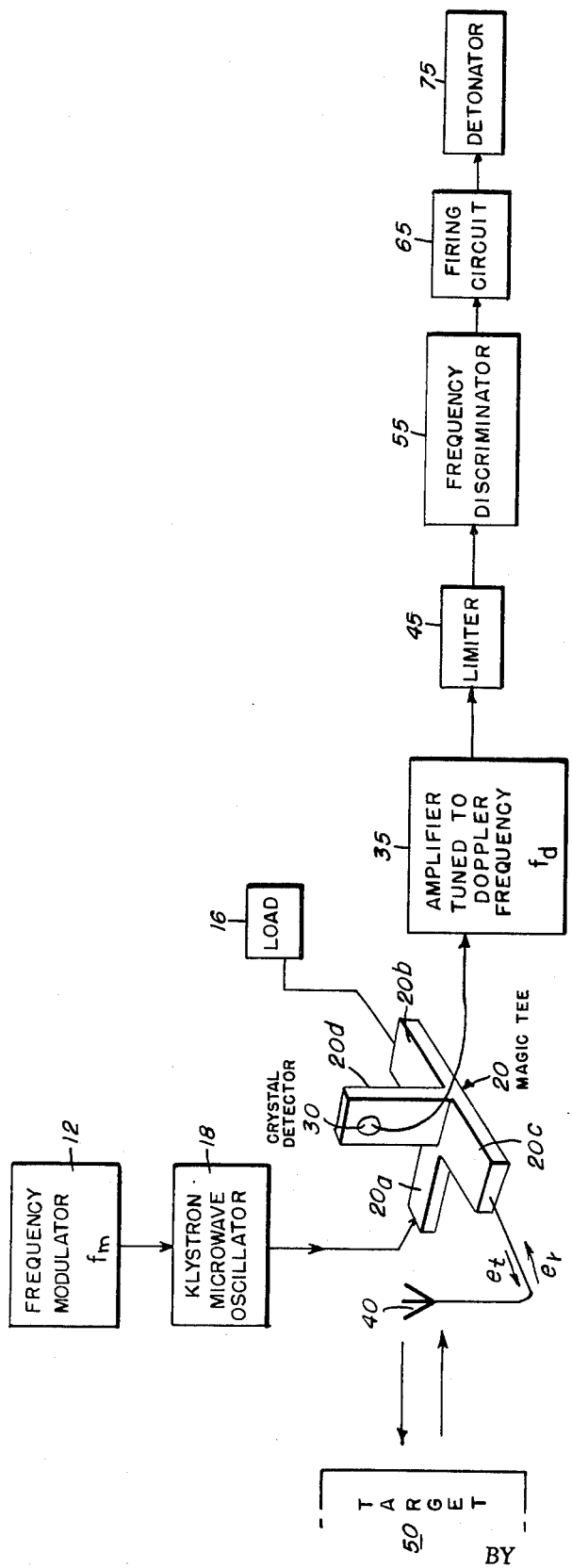
FIG. 5 is a block diagram of a doppler frequency modulated distance measuring system incorporated in a missile fuzing system in accordance with the invention.

In FIGS. 1 and 3 the vector $e_t$ represents the transmitted signal which rotates at an angular velocity $\omega_c$, frequency modulated by the modulation signal $f_m$. The observer is assumed to be located on a vector which moves synchronously with $e_t$ so that it seems to be at rest. The vector $e_r$ represents the received signal and rotates at an angular velocity $\omega_d = 2\pi f_d$ where $f_d$ is the doppler frequency. Also, the received signal vector $e_r$ swings back and forth by an angle $\pm \theta$ at the modulating frequency $f_m$. If the frequency deviation of the transmitter frequency is F and if D is the distance between the instrument and target, the angle $\theta$ may be represented in terms of F, D, the modulating frequency $f_m$, and the velocity of light c as follows:

$$\theta = \frac{2F}{f_m}\sin\frac{2\pi f_m D}{c} \quad (1)$$

which for small angles becomes:

$$\theta = \frac{4\pi FD}{c} \quad (2)$$

In FIGS. 1 and 3, the parameters are chosen so that $\theta = 0.5$ radians.

The graphs of FIGS. 1 and 3 are formed by the projection of the received signal vector $e_r$ on an axis parallel to the transmitted signal vector $e_t$, and will be representative of the signal obtained after mixing. The mixer output signal $e_x$ of both FIGS. 1 and 3 may be expressed by the conventional form of equation for a frequency modulated wave as follows:

$$e_x = K \cos[s - \omega_d t + \theta \cos(\omega_m t - p)] \quad (3)$$

where $\omega_d = 2\pi f_d$, $\omega_m = 2\pi f_m$, $K$ is an attenuation constant, and $s$ and $p$ are constant phase angles.

Although both mixer output signals are given by the same equation (3), their graphical forms, shown in FIGS. 1 and 3, and their respective frequency spectrums, appearing in FIGS. 2 and 4 together with the modulation signal $f_m$, are quite different because of the fact that while in FIG. 1 the modulation frequency $f_m$ is considerably higher than the doppler frequency $f_d$ as in prior art systems, in FIG. 3 just the opposite condition is chosen with the doppler frequency $f_d$ being considerably higher than the modulation frequency $f_m$.

It is to be understood, in connection with FIGS. 2 and 4, that only the fundamental components $f_d$ and $f_d \pm f_m$ of the spectra of the mixer output signals are shown, the higher order harmonic components, such as $f_d \pm 2f_m$, $f_d \pm 3f_m$, etc., being omitted. In prior art distance measuring systems, where $f_m > f_d$, only the sidebands $f_m \pm f_d$ and/or harmonics thereof are utilized, and these components are spread over a wide frequency band as shown in FIG. 2. To obtain distance information from such a spectrum, either counters or wideband discriminators have to be used.

In the present invention, however, where $f_d > f_m$, the frequency spectrum of the signal appearing at the output of the mixer is of the same form as a conventional frequency modulated wave with a carrier frequency $f_d$, and from equation (3), a frequency deviation F' expressible as:

$$F' = f_m\theta \quad (4)$$

Such a conventional form of frequency modulated wave can be treated like any standard F-M signal in the broadcast field so that it may be received and detected by a conventional F-M receiving and detecting system. The amplifier in such a system is tuned to the doppler frequency $f_d$ and is designed to have a bandwidth chosen in accordance with the range of distances being measured. It will be understood that because the voltage output of the frequency discriminator of an F-M system is proportional to the frequency deviation F', which is equal to $f_m\theta$ in the present case, the discriminator voltage output is also proportional to distance D in view of equation (2). The distance D can thus be directly determined by the deflection of a meter connected to the discriminator output.

In a system in accordance with the present invention as just described, amplitude modulation of the receiver or spurious reflections, whether internal or external, produce signals at the frequency $f_m$ or harmonics thereof, and therefore cannot pass the amplifier which is tuned to the doppler frequency $f_d$. The amount of such spurious modulation frequency energy which is within the bandwidth of the amplifier is so small as to be entirely negligible. Therefore, a single antenna can be employed provided that overloading of the detector by the transmitter signal is prevented. Any standard means for attenuating the portion of the transmitter signal fed directly to the mixer will prevent overloading, such as a magic tee arranged in the manner explained in detail below in conjunction with FIG. 5. Also, no servo-loop is required because of the insensitivity of the system to signals at the modulation frequency $f_m$ and, because of the use of limiters and frequency discriminators, the distance measurement may be made independent of variations in the target reflection coefficient.

The only undesirable feature of the above-described system is its dependence upon the existence of a fairly constant doppler frequency. The doppler frequency is well known to be proportional to the relative velocity. As explained previously, the requirement of a constant doppler frequency is not objectionable when the system is used with missiles, because missiles ordinarily reach a predictable terminal velocity as they approach the earth. Where operation over a wide range of doppler frequencies is desired, however, mixer means responsive to the doppler frequency may be incorporated to effectively vary the center frequency of the receiver as will hereinafter be described.

FIG. 5 is a block diagram of a missile fuzing system in which the doppler frequency modulated distance measuring system of the invention is incorporated. In FIG. 5, a conventional type of antenna 40 is adapted to radiate energy toward a target 50 and receive energy reflected therefrom. A klystron microwave oscillator 18, which is modulated by a frequency modulator 12, feeds its output signal to an H-arm 20a of a magic tee 20 having one side arm 20b connected to a matching load 16, its other side arm 20c connected to the antenna 40, and its E-arm 20d having a crystal detector 30 disposed therein, in accordance with well known practice. The frequency modulator 12 is adapted to modulate the microwave oscillator 18 at a modulation frequency $f_m$ which is considerably lower than the doppler frequency $f_d$ which the missile is expected to experience. For example, if the doppler frequency $f_d$ is 20,000 cycles, the modulation frequency $f_m$ could be 5,000 cycles with a deviation F of about ±1 megacycle. Ratios of doppler frequency $f_d$ to modulation frequency $f_m$ of at least two to one have been found satisfactory.

The output from the crystal detector 30 is fed to an amplifier 35 tuned to the doppler frequency $f_d$ occurring when the missile falls at terminal velocity. If $\theta_o$ and $F_o'$ are the values of $\theta$ and F' at the distance fuze functioning is desired (see equations (2) and (4), the bandwidth of the amplifier 35 is preferably chosen to be sufficient to amplify $f_d \pm F_o'$ for $\theta_o > 1$ and $f_d \pm f_m$ for $\theta_o < 1$, where $F_o' = f_m \theta_o$. The amplified output of the amplifier 35 is fed to a limiter 45 to obtain an essentially constant amplitude signal, and then to a frequency discriminator 55 to transform the distance information from its frequency form into amplitude form. The frequency discriminator 55 is designed to respond to substantially $f_d \pm F_o'$ for $\theta_o > 1$ and $f_d \pm f_m$ for $\theta_o < 1$, the output voltage of the discriminator being proportional to distance D.

A firing circuit 65 having its input connected to the output of the discriminator 55 is adapted to produce a firing signal when the output of the discriminator 55 reaches a predetermined amplitude corresponding to a desired functioning distance. This firng signal may be fed to a detonator 75 to initiate missile detonation.

It is to be understood that the above described components, shown in block form in FIG. 5, are well known in the art and can readily be provided.

The operation of the embodiment of FIG. 5 may be explained as follows. The transmitted signal $e_t$ which is frequency modulated at $f_m$ is fed from the oscillator 18 into the side arm 20a of the magic tee 20, whereupon it passes to the other side arm 20c to be fed to the antenna 40 and radiated to the target 50. The load 16 is chosen so that only a very small portion of the energy of the transmitted signal $e_t$ passes to the crystal detector 30 in the E-arm 20d. The received signal $e_r$ from the target 50 is picked up by the antenna 40, fed to the arm 20c, and passes to the crystal detector 30 to be mixed with this small portion of the transmitted signal $e_t$. The effect of the magic tee, therefore, is merely to permit the received signal $e_r$ to be mixed with a small enough transmitted signal $e_t$ so as not to overload the crystal mixer 30. It will thus be understood that critical adjustment of the magic tee 20 is not necessary.

The output of the crystal mixer 30 will be a conventional form of F-M wave having the shape shown in FIG. 3 and the fundamental frequency spectrum shown in FIG. 4; that is, it will consist of the carrier frequency $f_d$, and sidebands $f_d \pm f_m$, $f_d \pm 2f_m$, $f_d \pm 3f_m$, etc. The detector output signal is amplified by the amplifier 35, limited by the limiter 45, and then fed to a frequency discriminator 55, the output voltage of which will have a predetermined value dependent upon target distance. The output voltage from the discriminator 55 is fed to the firing circuit 65 which produces a firing signal which activates the detonator 75 when the discriminator output voltage reaches a predetermined value corresponding to a predetermined distance at which detonation is desired. From equation (2) it can be seen that for a given bandwidth of the amplifier 35, variation of the frequency deviation F of the transmitter frequency varies the distance at which the discriminator output voltage reaches a predetermined value. Where operation over a wide range of missile velocities is necessary or desired, the modification shown in FIG. 6 may be incorporated in the embodiment of FIG. 5 to permit the system to be used under such circumstances.

In FIG. 6 the signal from the crystal detector 30 is first fed to a mixer 21 (instead of directly to the amplifier 35, as in FIG. 5) where it is mixed with a signal of frequency $f_o$ from a local oscillator 28 to produce a mixer output signal having a carrier frequency $(f_o + f_d)$. The frequency $f_o$ of the local oscillator 28 is caused to vary in response to changes in the doppler frequency $f_d$ so that the sum $(f_o + f_d)$ remains substantially constant. Then, substituting the amplifier 37 tuned to $(f_o + f_d)$ in place of the amplifier 35 of FIG. 5, and substituting the frequency discriminator 57 adapted to operate with a carrier frequency $(f_o + f_d)$ for the discriminator 55 of FIG. 5, the system will be operable over a wide range of doppler frequencies corresponding to a wide range of missile velocities.

Variation of the local oscillator frequency $f_o$ in response to doppler frequency variations is accomplished by also feeding the signal from the crystal detector 30 to a wideband amplifier 29 capable of amplifying the range of doppler frequencies over which operation is desired. The output of the amplifier 29 is fed to a limiter 27 and then to frequency discriminator 31 which produces an output voltage having an amplitude proportional to the doppler frequency $f_d$. The voltage output of the discriminator 31 feeds a reactance tube circuit 23 which controls the frequency $f_o$ of the local oscillator 28. The reactance tube circuit 23 is adapted to cooperate with the frequency discriminator 31 and the local oscillator 28 so that changes in the voltage output of the discriminator 31 in response to changes in the doppler frequency $f_d$ cause the reactance tube circuit 23 to change the frequency $f_o$ of the local oscillator 28 in a direction and by an amount which maintains the sum $(f_o + f_d)$ substantially constant.

In regard to the above described embodiments, it is to be understood that this invention can be applied to a wide variety of systems where distance measuring is involved and is not limited to the missile fuzing embodiment shown in the darwing. It will be apparent, therefore, that the illustrative embodiments described are only exemplary and that various modifications can be made in construction and arrangement within the scope of the invention as defined in the appended claims.

I claim as my invention:

1. A frequency modulated doppler distance measuring system comprising in combination: means for transmitting frequency modulated radiofrequency energy towards a target, said radiofrequency energy being frequency modulated at a modulation frequency which is considerably lower than the doppler frequency, means for receiving energy reflected from the target, means for mixing a portion of said transmitted energy with said received energy to produce a detected signal comprising a frequency modulated wave having a carrier frequency equal to the doppler frequency and sidebands equal, respectively, to the sums and differences of said carrier frequency and said modulation frequency and its harmonics, said frequency modulated wave having a frequency deviation which is dependent upon target distance, and frequency modulation receiver means to which said detected signal is fed for producing an indication which is a function of said frequency deviation, said last-mentioned means including an amplifier tuned to said doppler frequency.

2. A frequency modulated doppler distance measuring system comprising in combination: means for transmitting frequency modulated radiofrequency energy towards a target, said radiofrequency energy being frequency modulated at a modulation frequency which is considerably lower than the doppler frequency, means for receiving energy reflected from the target, means for mixing a portion of said transmitted energy with said received energy to produce a detected signal comprising a frequency modulated wave having a carrier frequency equal to the doppler frequency and sidebands equal, respectively, to the sums and differences of said carrier frequency and said modulation frequency and its harmonics, said frequency modulated wave having a frequency deviation which is dependent upon target distance, an amplifier to which said detected signal is fed, said amplifier being tuned to the doppler frequency and having a bandwidth which includes a significant portion of the frequency spectrum of said frequency modulated wave over the range of distances being measured, a limiter to which the output of said amplifier is fed for producing an essentially constant amplitude signal, a frequency discriminator to which the output of said limiter is fed, said discriminator producing an output voltage which is substantially proportional to target distance, and indication means to which the output of said discriminator is fed for providing an indication of target distance.

3. A frequency modulated doppler distance measuring system comprising in combination: means for transmitting frequency modulated radiofrequency energy towards a target, said radiofrequency energy being frequency modulated at a modulation frequency which is considerably lower than the doppler frequency, means for receiving energy reflected from the target, means for mixing a portion of said transmitted energy with said received energy to produce a detected signal comprising a frequency modulated wave having a carrier frequency equal to the doppler frequency and sidebands equal, respectively, to the sums and differences of said carrier frequency and said modulation frequency and its harmonics, said frequency modulated wave having a frequency deviation which is dependent upon target distance, a mixer having first and second inputs, said detected signal being fed to the first input of said mixer, a local oscillator having its output fed to the second input of said mixer, means to which said detected signal is also fed for changing the oscillation frequency of said local oscillator in response to changes in the doppler frequency so that the sum of the doppler frequency and said oscillation frequency remains substantially constant, an amplifier to which said detected signal is fed, said amplifier being tuned to a frequency equal to the sum of the doppler frequency and said oscillation frequency and having a bandwidth which includes a significant portion of the frequency spectrum of said frequency modulated wave over the range of distances being measured, a limiter to which the output of said amplifier is fed for producing an essentially constant amplitude signal, a frequency discriminator to which the output of said limiter is fed, said discriminator producing an output voltage which is substantially proportional to target distance, and indication means to which the output of said discriminator is fed for providing an indication of target distance.

4. A single antenna missile fuzing system adapted to function at a predetermined distance from a target, said system comprising in combination: a microwave oscillator, a frequency modulator for modulating said oscillator at a frequency which is considerably lower than the doppler frequency occurring when the missile is falling at terminal velocity, a magic tee having first and second side arms, an H-arm and an E-arm, the output of said microwave oscillator being fed to said H-arm, an antenna connected to said first side arm and adapted to radiate energy towards a target and receive energy reflected therefrom, a load connected to said second side arm, a crystal detector disposed in said E-arm, said load being chosen so that only a relatively small portion of the energy from said microwave oscillator passes to said crystal detector to mix with the received energy passing to said detector from said first side arm, the output of said detector comprising a frequency modulated wave having a carrier frequency equal to the doppler frequency and sidebands equal, respectively, to the sums and differences of said carrier frequency and said modulation frequency and its harmonics, said frequency modulated wave having a frequency deviation which is dependent upon target distance, an amplifier to which said detected signal is fed, said amplifier being tuned to the doppler frequency and having a bandwidth which is equal to at least twice said modulation frequency, a limiter to which the output of said amplifier is fed for producing an essentially constant amplitude signal, a frequency discriminator to which the output of said limiter is fed, said discriminator producing an output voltage which is substantially proportional to target distance, and means connected to the output of said discriminator for functioning said fuze when the output of said discriminator is a predetermined value corresponding to said predetermined distance.

* * * * *